US010788635B2

(12) United States Patent
Zeng et al.

(10) Patent No.: US 10,788,635 B2
(45) Date of Patent: Sep. 29, 2020

(54) DE-LATCHING MECHANISM AND OPTICAL MODULE INCLUDING THE SAME

(71) Applicant: Source Photonics (Chengdu) Company, Ltd., Chengdu (CN)

(72) Inventors: Yizhi Zeng, Chengdu (CN); Honggi Wu, Chengdu (CN); Ximin Chen, Chengdu (CN); Deke Li, Chengdu (CN); Jinlin Wang, Chengdu (CN)

(73) Assignee: Source Photonics (Chengdu) Company, Ltd., Chengdu (CN)

( * ) Notice: Subject to any disclaimer, the term of this patent is extended or adjusted under 35 U.S.C. 154(b) by 0 days.

(21) Appl. No.: 15/543,876

(22) PCT Filed: Jun. 6, 2017

(86) PCT No.: PCT/CN2017/087320
§ 371 (c)(1),
(2) Date: Jul. 14, 2017

(87) PCT Pub. No.: WO2018/223289
PCT Pub. Date: Dec. 13, 2018

(65) Prior Publication Data
US 2020/0088961 A1 Mar. 19, 2020

(51) Int. Cl.
*G02B 6/42* (2006.01)
(52) U.S. Cl.
CPC ......... *G02B 6/4261* (2013.01); *G02B 6/4284* (2013.01)
(58) Field of Classification Search
CPC .............................. G02B 6/4261; G02B 6/4284
See application file for complete search history.

(56) References Cited

U.S. PATENT DOCUMENTS

| 2004/0077207 A1* | 4/2004 | Ice | G02B 6/4201 |
| | | | 439/357 |
| 2008/0089649 A1* | 4/2008 | Wang | G02B 6/3897 |
| | | | 385/56 |
| 2009/0279831 A1 | 11/2009 | Luo et al. | |

FOREIGN PATENT DOCUMENTS

| CN | 202330785 U | 7/2012 |
| CN | 204422828 U | 6/2015 |
| CN | 205750008 U | 11/2016 |

OTHER PUBLICATIONS

Wang Weiguo; "Small-Size Optical-Electric Module Pull Ring Formula Unblock Reselling Means"; Bibliographic Data of CN205750008 (U); Nov. 30, 2016; https://worldwide.espacenet.com.
Guo Shengyi.; "Press-Fit Type Unlocking Device and RJ45 Port SFP Module Thereof"; Bibliographic Data of CN204422828 (U); Jun. 24, 2015; https://worldwide.espacenet.com.
(Continued)

*Primary Examiner* — Omar R Rojas
(74) *Attorney, Agent, or Firm* — Andrew D. Fortney; Central California IP Group, P.C.

(57) ABSTRACT

The present invention relates to a de-latching mechanism and optical module using the same. The de-latching mechanism includes a pull rod and a de-latching sheet or plate. The pull rod is configured to cause the de-latching sheet or plate to slide by rotating or sliding, thereby de-latch the optical module. The present invention provides a de-latching mechanism and optical module using the same with a simple structure and various convenient ways to de-latch the optical module, which can use a smaller rotational angle, simple condition(s) for de-latching and less de-latching environment support.

17 Claims, 6 Drawing Sheets

(56) References Cited

OTHER PUBLICATIONS

Zhang Shaoyou et al.; "XFP Optical Transceiver Module"; Bibliographic Data of CN202330785 (U); Jul. 11, 2012; https://worldwide.espacenet.com.
International Search Report and Written Opinion dated Feb. 2, 2018; International Application No. PCT/CN2017/087320; 11 pages; International Searching Authority/China, State Intellectual Property Office of the People's Republic of China; Beijing, China.

\* cited by examiner

DE-LATCHING MECHANISM AND OPTICAL MODULE INCLUDING THE SAME

FIELD OF THE INVENTION

The present invention relates to the field of optical communication technology, especially to a de-latching mechanism and an optical module including the same.

DISCUSSION OF THE BACKGROUND

Optical transceivers (or optical modules for short) are utilized to convert one or more optical signals into electrical signals and one or more electrical signals into optical signals. An optical module includes optoelectronic devices, functional circuits and optical interfaces, and plays an important role in optical communication systems. Package types for optical modules comprise QSFP28, CFP4, XFP, etc. For example, according to the applicable multi-source agreement or MSA, there must be a hot-plug connection between an XFP module and a cage or socket into which the module is inserted. Namely, the module can be disconnected from or connected with the cage or socket, with the power on. As an XFP module in use involves insertion and extraction, it needs a de-latching mechanism integrated into the module to effectively lock the module in or release the module from the cage. At present, some optical modules require a relative large rotational angle to de-latch the module. In this mechanism, a pull-tab is lifted at a relatively great angle to remove a de-latching sheet or plate that is in place, thereby de-latching the module. Otherwise, de-latching cannot be achieved, and a convex portion of the de-latching mechanism or the cage or socket may be damaged.

SUMMARY OF THE INVENTION

The present invention is intended to provide a de-latching mechanism and an optical module including the same.

In one aspect, the present invention provides a mechanism with various ways to de-latch an optical module. For this purpose, one or more embodiments of the present invention provides a technical scheme as below: a de-latching mechanism including a de-latching sheet or plate and a pull rod configured to cause the de-latching sheet or plate to slide by rotating or sliding, thereby de-latching the de-latching sheet or plate. In accordance with some embodiments of the present invention, the optical module comprises a base, the de-latching sheet or plate comprises a head connected to the pull rod via a spindle, and the pull rod is not fixed to the base. The de-latching sheet or plate may further include a tail that has a convex or rounded portion or projection configured to engage with and disengage from a locking plate or other locking mechanism of a cage or socket.

In another aspect, the present invention relates to reducing the overall size of optical module. For this purpose, in accordance with embodiments of the present invention, the de-latching sheet or plate comprises a 6-sided structure, including a vertical folding portion connected to the pull rod and a cross-folding portion connected to a connector section. The head of the 6-sided de-latching sheet or plate leaves a space for setting or securing a spring. A blocker can be fixed to the connector section, while the spring is located below the cross-folding portion. In this way, the space can optimize or maximize the reduction in the size of the optical module.

An optical module in accordance with embodiments of the invention comprises the de-latching mechanism. The optical module further comprises a base having a first groove in which the de-latching sheet or plate slides, and a second groove in which the pull rod slides or rotates.

The optical module comprises the de-latching mechanism in any embodiment of the present invention. In some embodiments, the optical module further comprises a base and a spring. The base has a first groove in which the de-latching sheet or plate slides, and a second groove in which the pull rod slides or rotates. The spring is configured to provide the de-latching sheet or plate with a restoring force to keep the optical module stable in a locked state. Relative to the prior art, the present invention advantageously provides a de-latching mechanism and optical module including the same that achieves de-latching by rotation, sliding movement, or a combination thereof. The de-latching mechanism provides various ways to de-latch the optical module, is convenient to operate, and has a simple structure, and is a desired de-latching component for optical module.

NUMERICAL SYMBOLS

Figure 1A:
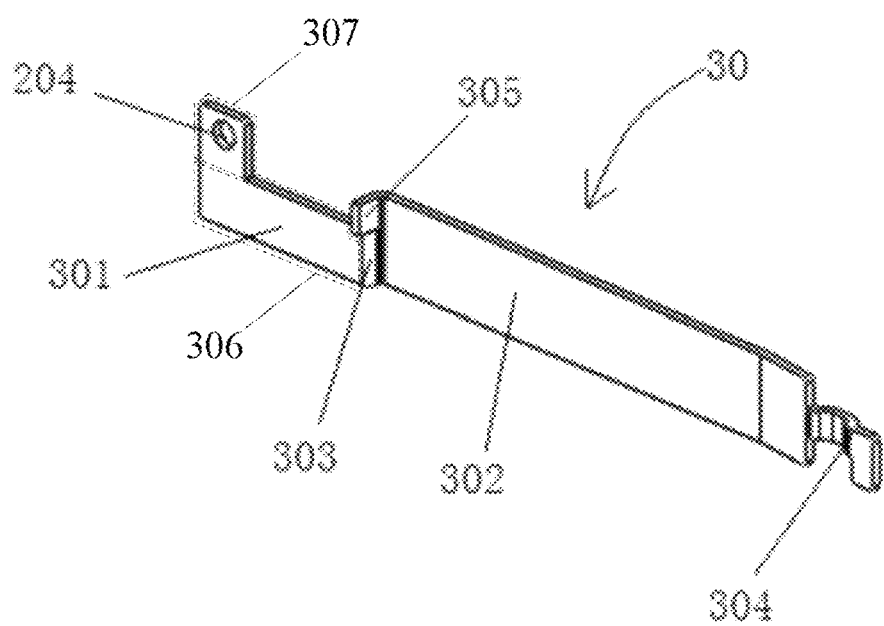
FIGS. 1(a)-(b) are structure diagrams showing an exemplary de-latching sheet at different angles in accordance with embodiments of the present invention.

10—base, 20—pull rod, 30—de-latching sheet, 40—spring, 50—shell, 201—connecting arm, 202—rotating arm, 203—spindle, 204—spindle hole, 301—de-latching sheet head, 302—de-latching sheet tail, 303—connector section, 304—convex or rounded portion or projection, 305—blocker.

DETAILED DESCRIPTION

Reference will now be made in detail to various embodiments of the invention, examples of which are illustrated in the accompanying drawings. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it will be readily apparent to one skilled in the art that the present invention may be practiced without these specific details. In other instances, well-known methods, procedures, components and circuits have not been described in detail so as not to unnecessarily obscure aspects of the disclosure.

Referring to FIGS. 1-7, embodiments of the present invention provide an optical module including a de-latching mechanism, a base 10 and a shell 50. The de-latching mechanism comprises a pull rod 20, a de-latching sheet or plate 30 and a spring 40.

Figure 2A:
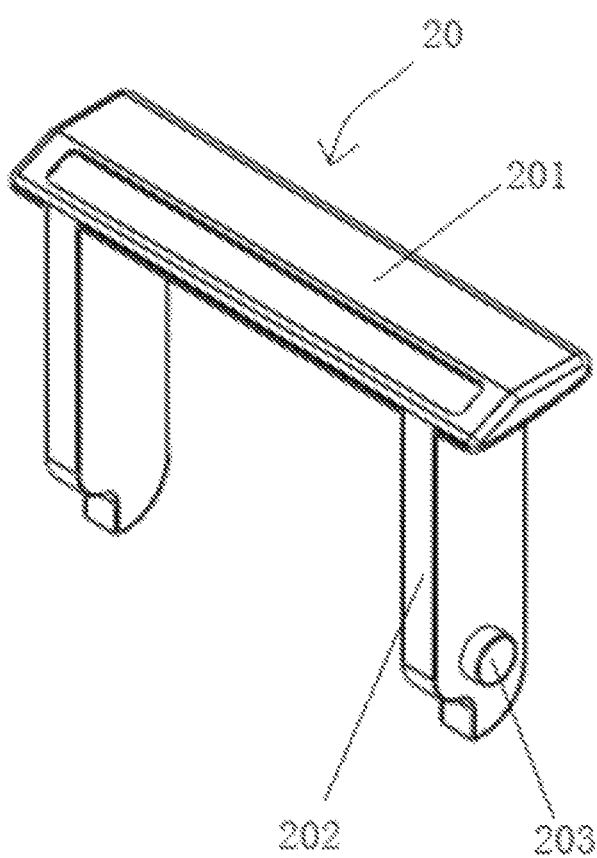
FIGS. 2(a)-(b) are structure diagrams showing an exemplary pull rod at different angles in accordance with embodiments of the present invention.
Figure 2B:
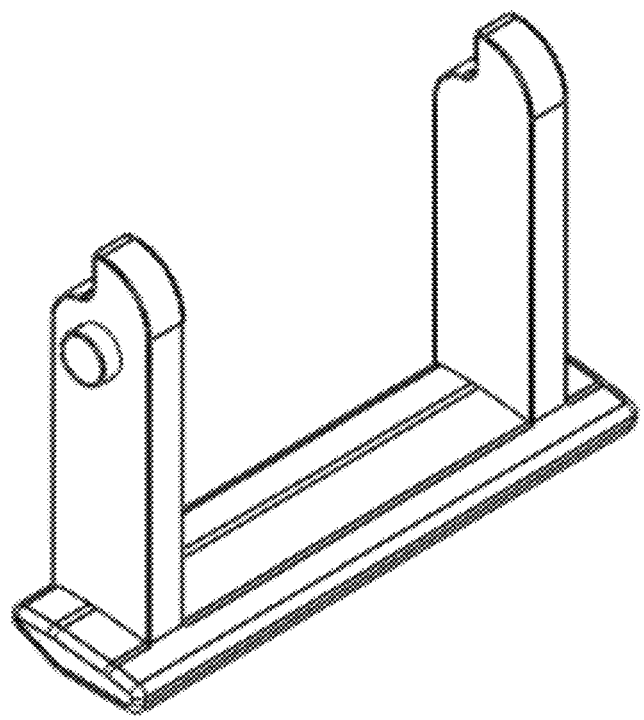

As shown in FIGS. 2(a)-(b), in one embodiment, the pull rod 20 comprises a C-, U-, L- or T-shaped structure, one section of which may be orthogonal to the remainder of the structure. The pull rod 20 comprises a connecting arm 201 and two symmetrical rotating arms 202. One end of each rotating arm 202 is connected to the connecting arm 201, while the other end includes or is attached to a spindle 203.

Figure 1B:
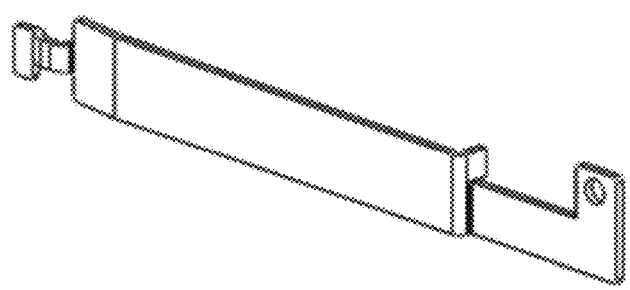

As shown in FIGS. 1(a)-(b), in one embodiment, the de-latching sheet or plate 30 comprises a head 301 and a tail 302. The head 301 has a spindle hole 204 in or through which the spindle 203 is inserted. When the pull rod 20 moves by rotating or sliding, it can cause the de-latching sheet or plate 30 to slide for de-latching the optical module. Accordingly, the base 10 may have a first groove along which the de-latching sheet or plate 30 slides during de-latching. Also, the base 10 may have a second groove 12 within which the rotating arm 202 of the pull rod 20 (including the spindle 203 and the bottom of the rotating arm 202) can slide when de-latching the optical module by sliding the pull rod 20.

The tail 302 has a convex or rounded portion or projection 304 configured to disengage or be retracted from the locking mechanism in sheets or plates of a case or socket that surround the base 10 when de-latching, thereby completely releasing an optical module from the case or socket. After de-latching is completed, the convex portion 304, which is not parallel to the head or tail of the de-latching sheet or plate 30, can prevent the de-latching sheet or plate 30 from continuing to slide towards the opening of the cage or socket and separating itself from the base 10.

Figure 3:
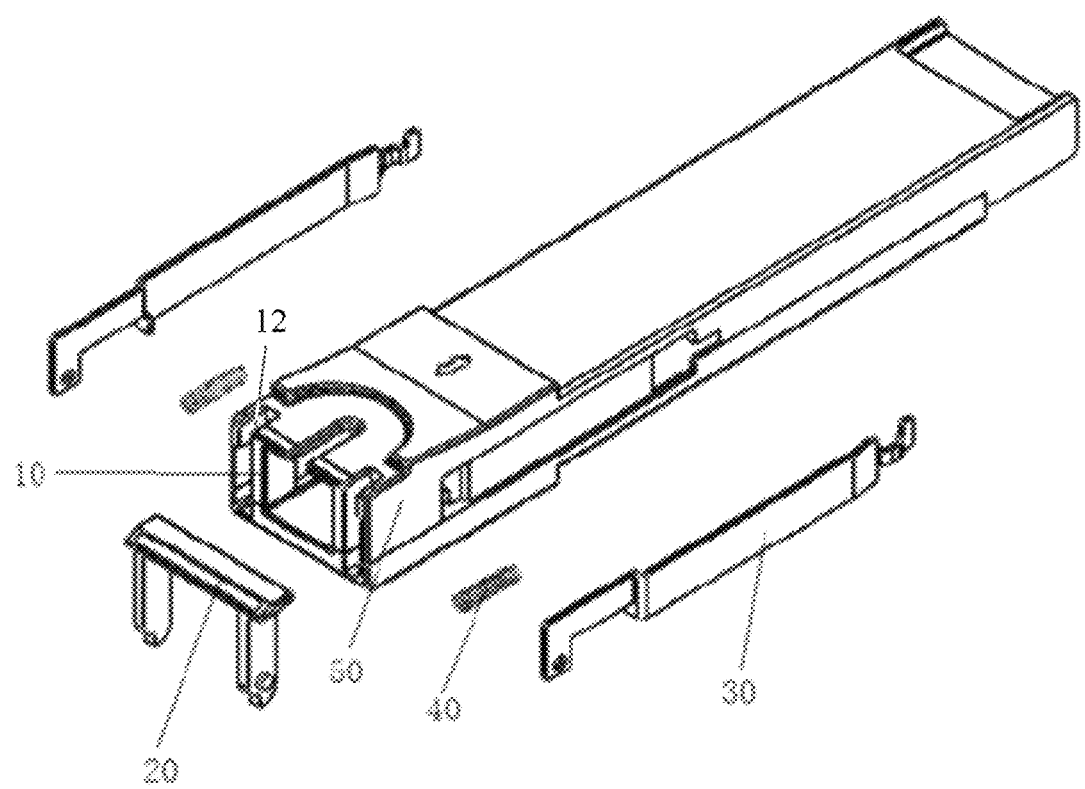
FIG. 3 is an exploded view of an exemplary optical module in accordance with embodiments of the present invention.
Figure 4:
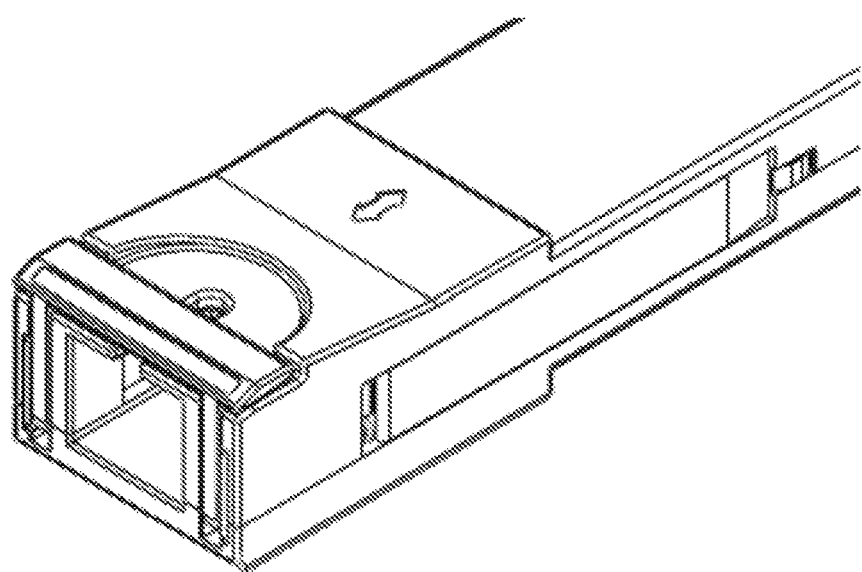
FIG. 4 is a structure diagram of an exemplary optical module in locked status.

In another embodiment, the head 301 and the tail 302 are linked through a connector section 303. The connector section 303 enables each of the head 301 and the tail 302 to be in different parallel planes. As shown, the connector section 303 may comprises an arc-shaped structure or bent structure. When the de-latching sheet or plate 30 is behind the base 10, the head 301 is shielded by the shell 50 and stays inside the shell 50, and the tail 302 is exposed to the outside of the shell 50. However, there is a gap between the tail 302 and the shell 50 when latched or in locked status. As shown in FIGS. 3-4, after de-latching, the tail 302 presses against the shell 50. As shown in FIGS. 5(b) and 6, the connector section 303 can prevent the de-latching sheet or plate 30 from sliding forward or even escaping from the base 10.

In an alternative embodiment, the head 301 and the tail 302 may be directly connected together as a whole.

Referring to FIGS. 1(a)-5, the de-latching sheets or plates 30 may include a blocker 305. A cavity to accommodate the spring 40 is between the blocker 305 and the base 10 on each side of the optical module. One end of the spring 40 contacts the blocker 305, while the other end contacts the base 10. On the one hand, the spring 40 provides an elastic force to keep the optical module in the latched or locked state, and on the other hand, the spring 40 may stay in state of compression after de-latching, such that the elastic force from the spring 40 and the pressing from the base 10 can prevent the de-latching sheet or plate 30 from exiting or leaving the base 10.

For the sake of reducing the size of the optical module, in an alternative embodiment, the head 301 may comprise a cross-folding portion 306 and a vertical folding portion 307. As shown in FIG. 1(a), the cross-folding portion 306 and the vertical folding portion 307 form a 6-sided structure, including the spindle hole 204 in the vertical folding portion 307. The blocker 305 is on the connector section 303, and the spring 40 is below the vertical folding portion 307. As the 6-sided structure of the head 301 provides some room for the spring 40, the size of the optical module can be reduced.

Figure 5A:
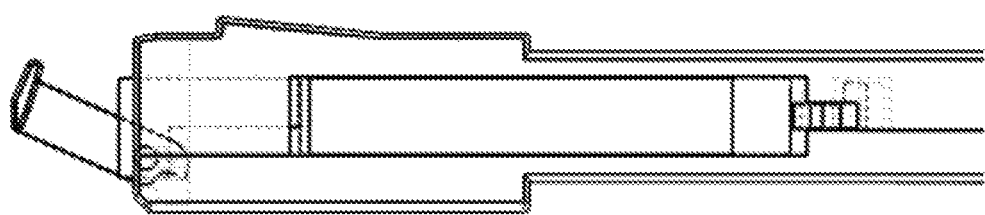
FIGS. 5(a)-(b) are perspective views of an exemplary optical module in de-latching and after de-latching by rotating the pull rod.
Figure 5B:
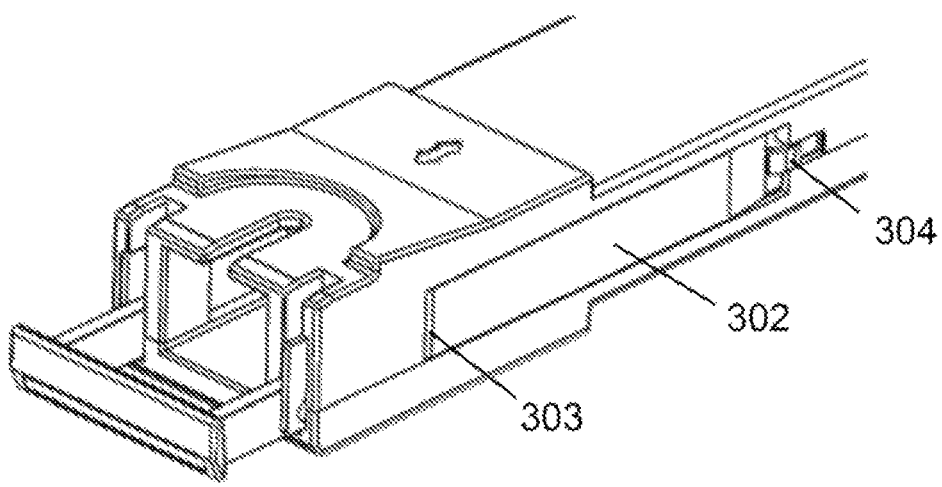
Figure 6:
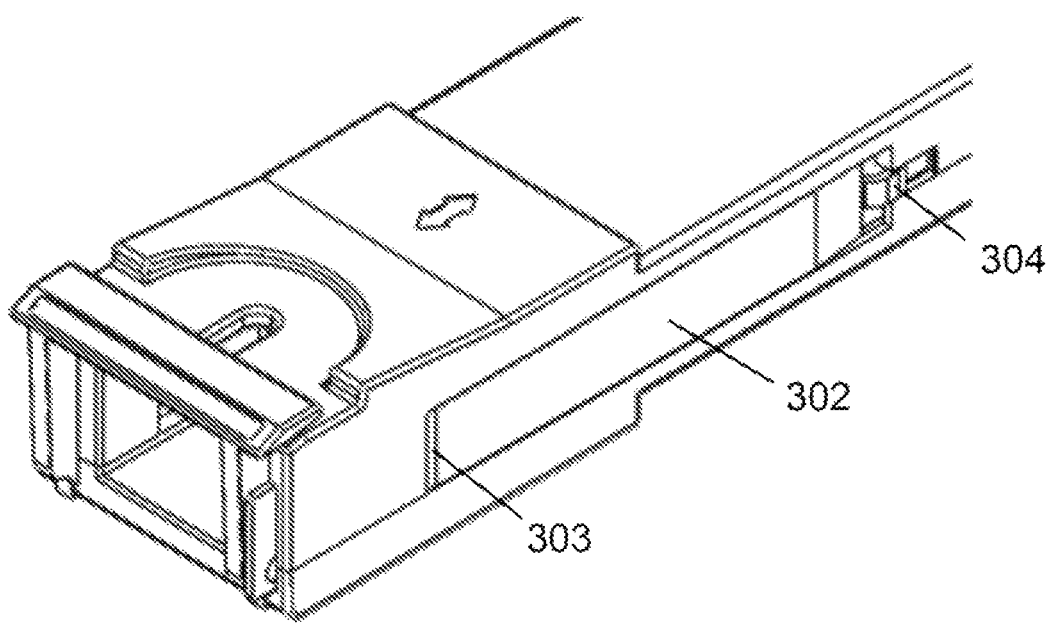
FIG. 6 is a perspective view of an exemplary optical module that de-latches by sliding the pull rod.

As shown in FIGS. 5(a)-5(b), the optical module can be released by rotation. De-latching may comprise rotating the pull rod 20 that serves as a cam during the rotation. The pull rod 20 is immediately adjacent to the side walls of the base 10 and causes the de-latching sheet or plate 30 to slide out from the optical module as shown in the drawings, thereby enabling the convex portion 304 to gradually de-latch or unlock the optical module from the cage or socket.

Referring to FIG. 6, the optical module can also be released by sliding movement of the pull rod 20. In such embodiments, de-latching comprises pulling the pull rod 20 away from the optical module, which drives the de-latching sheet or plate 30 towards the front of the optical module, thereby enabling the convex portion 304 to gradually de-latch the optical module from the cage or socket.

Figure 7:
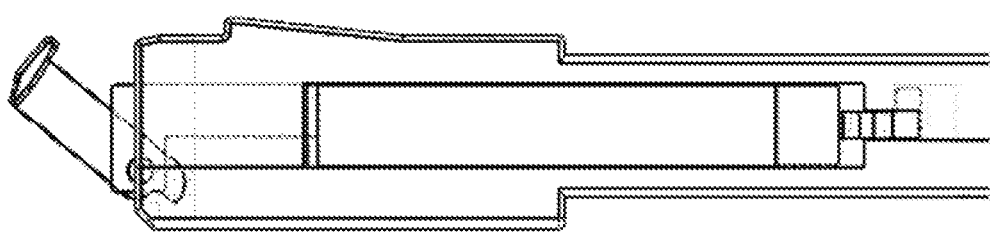
FIG. 7 is a perspective view of an exemplary optical module employing a combination of sliding movement and rotation for de-latching.

As shown in FIG. 7, the optical module can be released by a combination of rotation and sliding movement. In such embodiments, de-latching comprises rotating and pulling the pull rod 20, in which case the pull rod 20 slides the de-latching sheet or plate 30 towards the front of the optical module. The pull rod 20 is not immediately adjacent to the side walls of the base 10, thereby enabling the convex portion 304 to gradually de-latch the optical module from the cage or socket.

With regard to conventional structures that employ only rotation to de-latch an optical module, the conventional structure needs to rotate the pull rod at a relatively great angle to de-latch the optical module. Furthermore, if the rotation angle is not suitable, the locking sheet or plate of the cage or socket cannot completely release the latching or locking mechanism of the optical module, and it may require a lot of force or power to extract the module, and may not even be able to de-latch the module. The present de-latching mechanism and optical module including the same provides three ways of de-latching that can be applied in many cases. Moreover, relative to conventional optical modules requiring a relatively large rotation angle for de-latching, the present de-latching mechanism and optical module including the same includes a simple and more compatible de-latching mechanism, as well as low requirement for de-latching conditions and space.

For example, the optical module of the present invention conforms to the XFP MSA, and the de-latching mechanism can be applied to applications with latching or locking structures flanking a cage or socket such as a QSFP+-compatible cage or socket, a CFP4-compatible cage or socket, etc. The optical module may further comprise transmitter and receiver optical subassemblies or OSAs and PCBs. The OSAs may be electrically coupled to the PCB, and may convert electrical signals received from one or more host devices via the PCB into corresponding optical signals and optical signals received from other optical modules via an optical fiber into corresponding electrical signals for outputting to the host device(s).

The foregoing descriptions of specific embodiments of the present invention have been presented for purposes of illustration and description. They are not intended to be exhaustive or to limit the invention to the precise forms disclosed, and obviously many modifications and variations are possible in light of the above teachings. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

The invention claimed is:

1. An optical module, comprising:
    a de-latching mechanism comprising a pull rod, a spindle, a de-latching sheet or plate, and a spring, wherein:
        the de-latching sheet or plate comprises a head, a tail, and a connector section linking the head and the tail such that the head and the tail are in different parallel planes,
        the spindle connects the head to the pull rod,
        the head includes a vertical folding portion connected to the pull rod and a cross folding portion connected to the connector section, the vertical folding portion and the cross folding portion forming a space for setting or securing the spring,
        the pull rod is configured to cause the de-latching sheet or plate to slide by rotating and, separately or in combination, by sliding to de-latch the optical module, and
        the spring is configured to provide the de-latching sheet or plate with a restoring force to keep the optical module stable when latched or in a locked status,
    a base having a first groove in which the de-latching sheet or plate slides, and a second groove in which the pull rod slides in a same direction as the de-latching sheet or plate,
    a shell configured to prevent the de-latching sheet or plate from sliding after de-latching, and
    a cavity adjacent to the vertical folding portion and the cross folding portion that accommodates the spring.

2. The optical module of claim 1, wherein the tail has a convex or rounded portion or projection configured to engage with and disengage from a locking plate or sheet of a cage or socket into which the optical module is inserted.

3. The optical module of claim 1, wherein the connector section is configured to keep one of the head and the tail inside the shell and the other outside the shell.

4. The optical module of claim 1, further comprising a printed circuit board (PCB) and an optical subassembly (OSA) electrically coupled to the PCB.

5. The optical module of claim 2, wherein the optical module is compatible with an XFP multi-source agreement (MSA), a QSFP+MSA and/or a CFP4 MSA.

6. The optical module of claim 1, wherein the de-latching sheet or plate has a blocker, and the cavity accommodates the spring between the blocker and the base.

7. The optical module of claim 1, further comprising another de-latching sheet or plate, wherein the de-latching sheet or plate and the other de-latching sheet or plate are on opposite sides of the optical module.

8. The optical module of claim 7, wherein the pull rod has two spindles that respectively connect the pull rod to the de-latching sheet or plate and to the other de-latching sheet or plate.

9. The optical module of claim 7, wherein the other de-latching sheet or plate comprises another head, another tail, and another connector section linking the other head and the other tail such that the other head and the other tail are in different parallel planes.

10. The optical module of claim 9, wherein the other de-latching sheet or plate is identical to the de-latching sheet or plate.

11. The optical module of claim 10, wherein the other head of the other de-latching sheet or plate is connected to the pull rod by another spindle.

12. The optical module of claim 9, wherein the other head includes another vertical folding portion connected to the pull rod and another cross folding portion connected to the other connector section, the other vertical folding portion and the other cross folding portion forming another space for setting or securing another spring.

13. The optical module of claim 12, further comprising the other spring and another cavity adjacent to the other vertical folding portion and the other cross folding portion that accommodates the other spring.

14. The optical module of claim 13, wherein the other spring is configured to provide the other de-latching sheet or plate with another restoring force to keep the optical module stable when latched or in a locked status.

15. The optical module of claim 10, wherein the base has another first groove in which the other de-latching sheet or plate slides, and a plurality of second grooves in which the pull rod slides in the same direction as the de-latching sheet or plate and the other de-latching sheet or plate.

16. The optical module of claim 10, wherein the other tail has another convex or rounded portion or projection configured to engage with and disengage from another locking plate or sheet of the cage or socket.

17. The optical module of claim 13, wherein the other de-latching sheet or plate has another blocker, and the other cavity accommodates the other spring between the other blocker and the base.

* * * * *